United States Patent [19]
Knodle et al.

[11] Patent Number: 5,807,180
[45] Date of Patent: Sep. 15, 1998

[54] CONSTANT VELOCITY UNIVERSAL JOINT SHAFT AND INNER RACE COMBINATION

[75] Inventors: Jeffrey M. Knodle, Ida, Mich.; Christopher C. Cheney, Bowling Green, Ohio

[73] Assignee: Dana Corporation, Toledo, Ohio

[21] Appl. No.: 919,530

[22] Filed: Aug. 28, 1997

[51] Int. Cl.$^6$ .................................................. F16D 3/224
[52] U.S. Cl. .................... 464/139; 464/144; 464/906; 403/357
[58] Field of Search ................................ 464/139, 143, 464/145, 101, 144, 146, 906; 403/357, 356, 355, 329, 326

[56] References Cited

U.S. PATENT DOCUMENTS

| | | |
|---|---|---|
| 2,089,168 | 8/1937 | Brown . |
| 2,987,897 | 6/1961 | Spence . |
| 3,789,626 | 2/1974 | Girguis . |
| 3,832,076 | 8/1974 | Gehrke . |
| 3,964,833 | 6/1976 | Mantiguez ........................... 403/357 |
| 4,079,599 | 3/1978 | Girguis ................................ 464/906 |
| 4,756,640 | 7/1988 | Gehrke ................................ 464/145 |
| 4,813,808 | 3/1989 | Gehrke ................................ 464/906 |
| 5,290,203 | 3/1994 | Krude ................................. 464/145 |
| 5,643,092 | 7/1997 | Girguis ................................ 464/145 |

Primary Examiner—Eileen A. Dunn
Attorney, Agent, or Firm—MacMillan, Sobanski & Todd, LLC

[57] ABSTRACT

A constant velocity joint shaft and inner race combination is provided. The combination includes a shaft having an annular shoulder and a splined section generally adjacent to the shoulder. An inner race with a splined bore is fitted over the splined section of the shaft. A retaining member is provided to connect the inner race to the shaft. The retaining member has an annular body with a plurality of tabs extending in a forward axial direction to be crimped over the shaft annular shoulder. The retaining member also includes a plurality of elongated arms. The elongated arms extend from the annular body in a rearward axial direction completely through the inner race bore. The arms have an acutely bent finger at their extreme end to axially retain the inner race on the shaft. To ease assembly, the retaining member can be pre-assembled on the shaft.

20 Claims, 4 Drawing Sheets

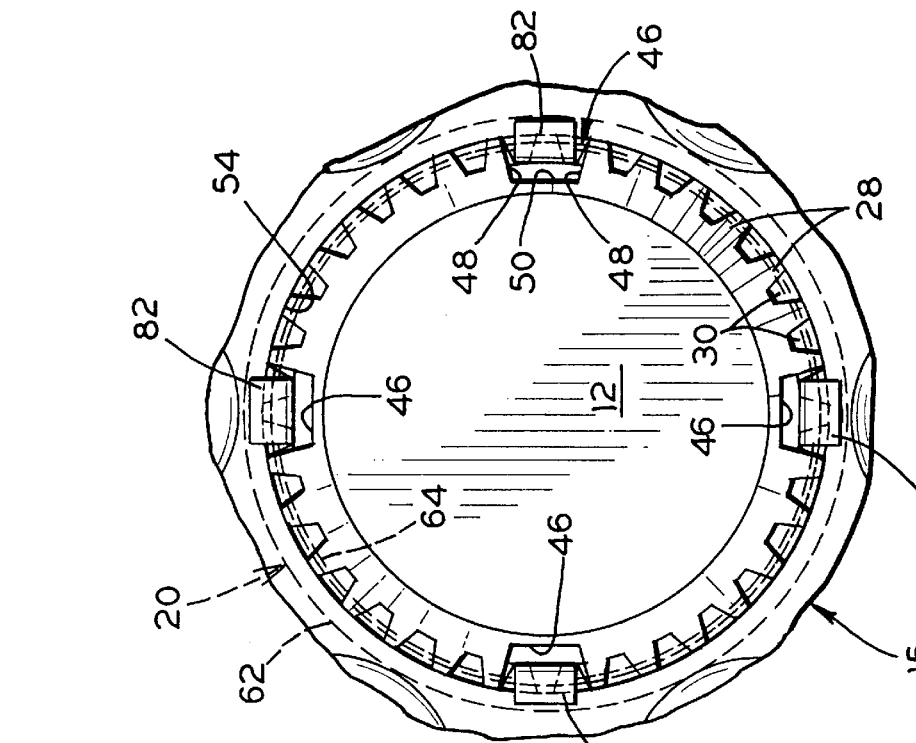
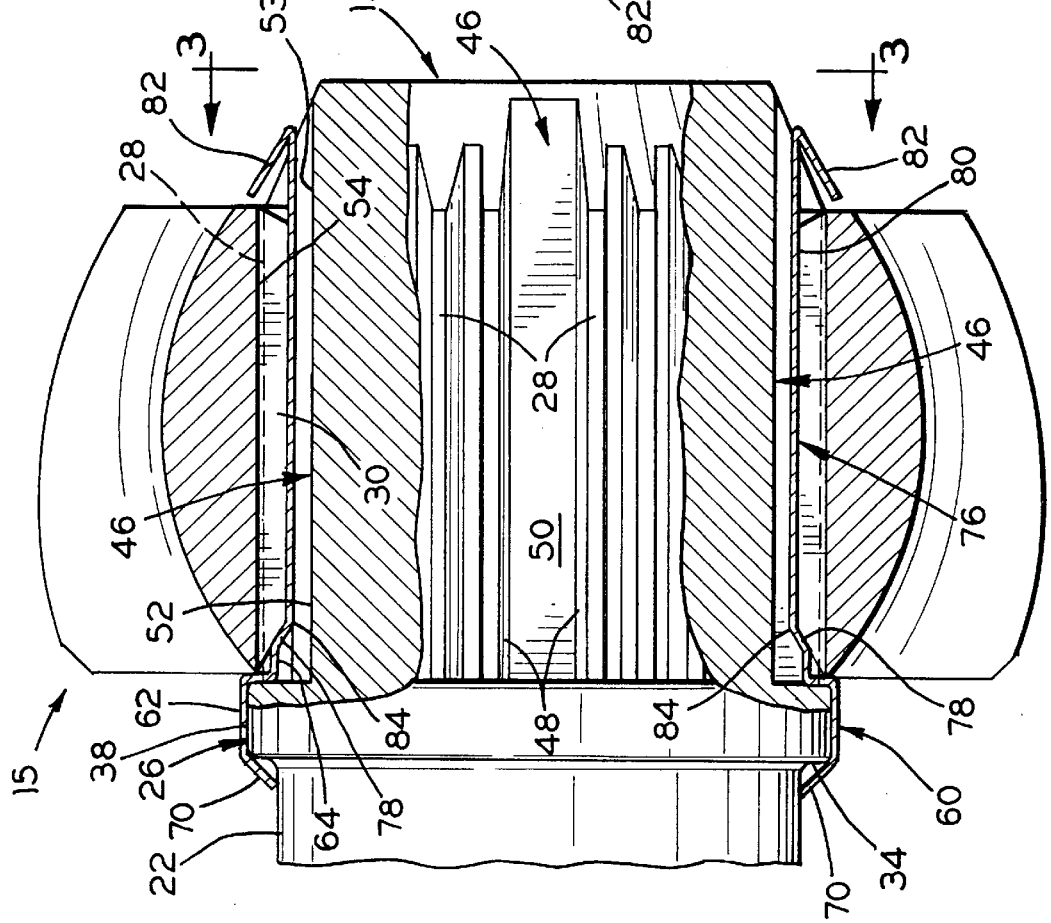
FIG. 3
FIG. 2

CONSTANT VELOCITY UNIVERSAL JOINT SHAFT AND INNER RACE COMBINATION

BACKGROUND OF THE INVENTION

This invention relates to constant velocity universal joints. More particularly, this invention relates to an improved structure and method for combining a shaft with an inner race in a constant velocity universal joint.

Universal joints are commonly used in the drive train systems of automotive vehicles. A universal joint is a mechanical coupling device which provides a rotational driving connection between two rotatable shafts, while permitting such shafts to be oriented at an angle relative to one another. For example, a universal joint is commonly used to provide a rotational driving connection between a rear end of a drive shaft (sometimes referred to as a propeller shaft) rotatably driven by a vehicle engine (via a transmission) and an input shaft connected to the vehicle rear axle assembly (sometimes referred to as a differential input shaft). This is because the drive shaft and the rear axle assembly input shaft are rarely coaxially aligned. To accommodate this non-alignment, while still providing a rotational driving connection, a universal joint is provided therebetween.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the angle of rotation. In a non-constant velocity type of universal joint, the instantaneous angular velocities of the two shafts vary with the angle of rotation (although the average angular velocities for a complete rotation are equal).

A typical structure for a constant velocity universal joint includes a cylindrical inner race connected to one of the shafts and a hollow cylindrical outer race connected to the other of the shafts. The outer surface of the inner race and the inner surface of the outer race have respective pluralities of grooves formed therein. The grooves extend linearly and have generally semi-circular cross sectional shapes. Each groove formed in the outer surface of the inner race is associated with a corresponding groove formed in the inner surface of the outer race. A ball is disposed in each of the associate pairs of grooves. The balls provide a driving connection between the inner and outer races. An annular cage is typically provided between the inner and outer races for retaining the balls in the grooves. The cage is provided with a plurality of circumferentially spaced openings for this purpose.

As previously mentioned a constant velocity universal joint includes a shaft connected to a cylindrical inner race. The shaft is positioned inside a central bore of the inner race. The shaft is provided with splines on its outer diameter. The central bore of the inner race is provided with splines with mate with the splines on the shaft. Therefore relative rotational movement between the shaft and the inner race is prevented, and when either the shaft or the inner race is rotated, the other also rotates.

The inner race must also be axially fixed on the shaft. Therefore an outward facing annular groove in provided on the circumference of the shaft in a section of the shaft that has been splined. A mating inwardly facing annular groove is provided in the bore of the inner race. A fastener referred to as a snap ring or C-ring is placed adjacent the splines on the shaft. The C-ring is pushed over the shaft splines until the C-ring drops into the shaft annular groove. The inner race is then encircled about the shaft. The bore of the inner race initially compresses the C-ring as the inner ring moves axially with respect to the shaft. When the inward facing annular groove of the inner race bore reaches the C-ring, the C-ring expands into the inward facing annular groove. The shaft is then axially locked to the inner race. However since the annular grooves on the shaft and the inner race are slightly wider in the axial direction than a thickness of C-ring (to allow the C-ring to enter into the annular grooves), slight axial movement between the inner race and shaft can still occur. To eliminate the slight axial movement a spacer ring may be used. The spacer ring in fitted within a second annular groove provided on the shaft. The spacer ring will abut against a face of the inner race to trap the inner race in its axial position upon the shaft. The use of a C-ring to make the axial connection between the shaft and the inner race is often difficult to achieve in a production environment wherein time is critical. Axially positioning the inner race with respect to the shaft for proper C-ring placement into the shaft and inner race annular grooves has been found to be difficult. The assembly is even further complicated if a spacer ring is utilized. A critical portion of the assembly process is hidden from view of the operator. In some assembly operations the whole universal joint (inner race, cage and outer race) is assembled, and then the entire universal joint is slipped onto the shaft. The boot obscures the view of the various parts, and the so that the connection of the universal joint with the shaft is a blind operation. It would be desirable to provide a constant velocity universal joint shaft and inner race combination which would be easier to assemble than a shaft and inner race combination which utilizes C-rings. Further, when the universal joint must be removed from the shaft for repair, it must be easy to disconnect the inner race from the shaft.

SUMMARY OF THE INVENTION

To meet the above noted desire and to provide other advantages, the present invention provides a constant velocity joint shaft and inner race combination with an improved attachment of the inner race to the shaft. The combination includes a shaft having an annular shoulder and a splined section. An inner race with a splined bore is fitted over the splined section of the shaft. A retaining member is provided to connect the inner race to the shaft. The retaining member has an annular body with a plurality of tabs extending in a forward axial direction to be crimped over the shaft annular shoulder. The retaining member also includes a plurality of elongated arms. The elongated arms extend from the annular body in a rearward axial direction completely through the inner race bore, and the arms engage the rear face of the inner race to lock the inner race onto the shaft.

Another embodiment of the invention includes a combination of a constant velocity joint shaft and a constant velocity universal joint, including an input shaft, a constant velocity universal joint, and a retaining member for locking them together. The input shaft has an annular shoulder and a splined section generally adjacent the shoulder, with the shaft splined section having a plurality of axial grooves. The constant velocity universal joint has an output shaft and an inner race with a splined bore fitted over the splined section of the input shaft. The retaining member has an annular body with a plurality of tabs extending in a first axial direction and bent over the annular shoulder. The retaining member includes a plurality of elongated arms extending from the annular body in a second axial direction completely through the inner race bore, each of the elongated arms being aligned with an axial groove of the input shaft splined section, and each of the elongated arms having an acutely angled radially outward extending finger at an extreme end of the elongated arm to axially retain the inner race on the input shaft.

In another embodiment, the invention comprises the retaining member including an annular body with a plurality of tabs extending in a first axial direction, the tabs being bendable so that they can be bent over the an annular shoulder of the shaft to thereby secure the retaining member to the shaft. The retaining member also includes a plurality of elongated arms extending from the annular body in a second axial direction so that they can be extended completely through the a bore in the inner race, the elongated arms having a finger at an extreme end to axially retain the inner race on the shaft.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a sectional view of a preferred embodiment constant velocity universal joint according to the present invention.

FIG. 3 is a view taken along line 3—3 of FIG. 2.

DETAILED DESCRIPTION OF THE PREFERRED EMBODIMENT

Figure 1:
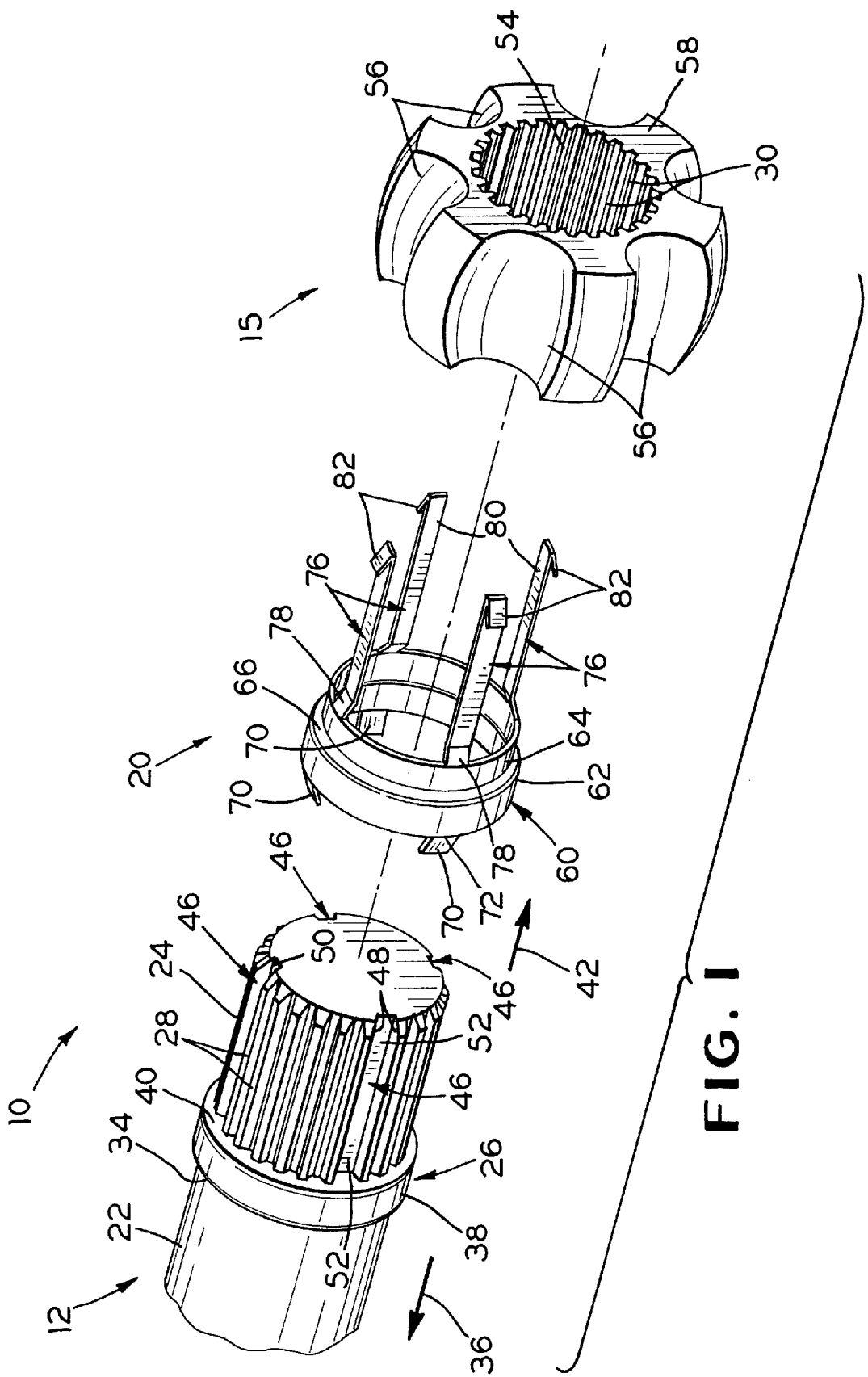
FIG. 1 is a schematic exploded view in elevation of the constant velocity joint shaft and inner race combination of the invention.
Figure 4:
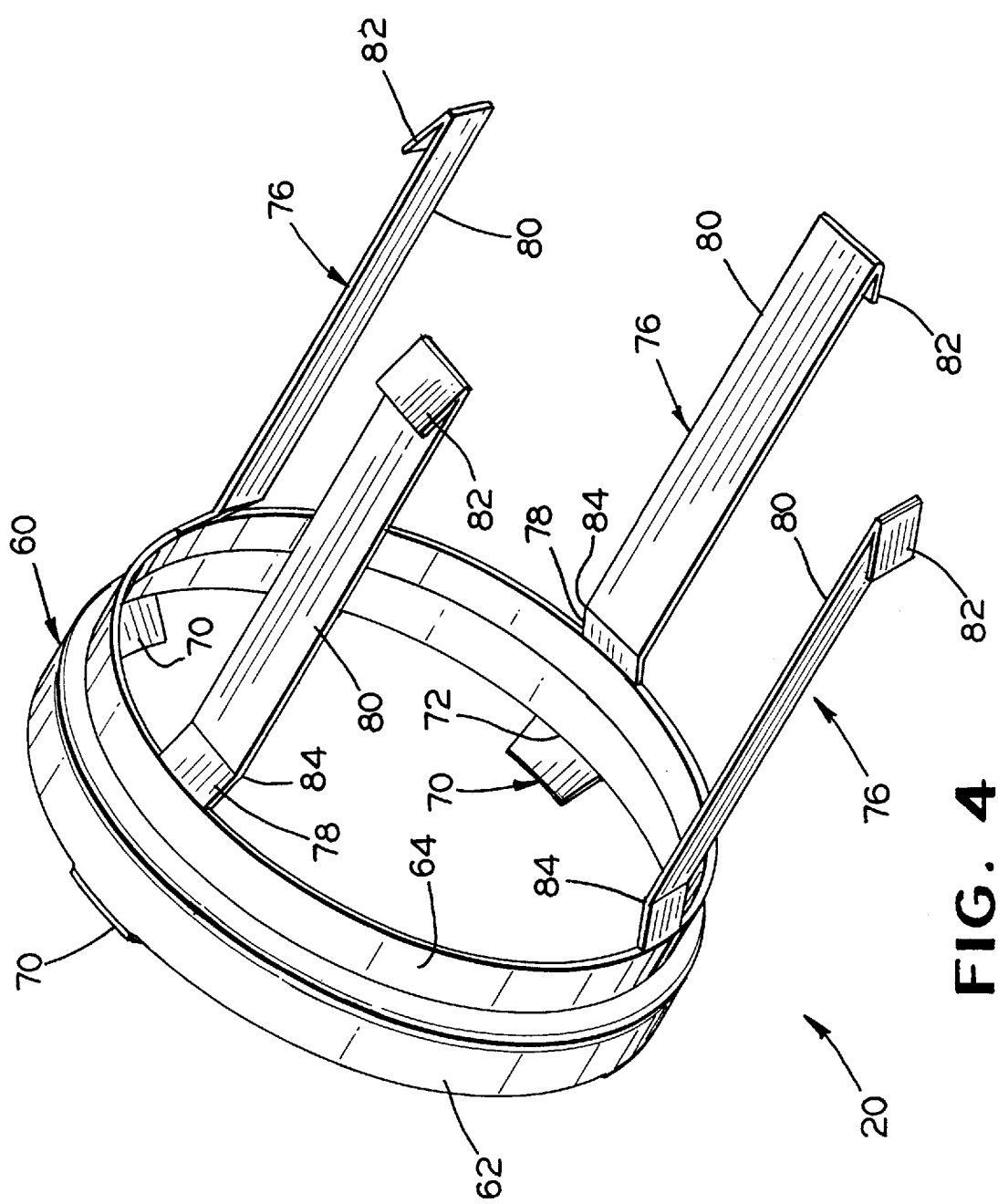
FIG. 4 is an enlarged perspective view of the retaining member shown in FIGS. 1–3.

Referring to FIGS. 1–4, the present inventive constant velocity joint shaft and inner race combination is indicated generally at 10. The combination is generally comprised of the shaft 12, the inner race 15, and the retaining member 20. The shaft is generally comprised of a shank 22 and a splined section 24, with the shank 22 and splined section 24 being separated by a raised shoulder 26. The splined section 24 is provided with a plurality of splines 28 suitable for mating with the splines 30 of the inner race 15.

The shoulder 26 of the shaft 12 has a radiused front face 34, facing in a forward or first direction, as indicated by arrow 36. The shaft shoulder 26 also has a midsection 38, and a rear face 40, facing a rear or second direction, as indicated by arrow 42.

Geometrically spaced on the shaft splined section 24 are four axial grooves 46. The grooves 46 have opposing walls 48 and a flat floor 50. The grooves 46 are tapered in such a manner that their radial depth increases in an axial direction away from the shaft shoulder 26. The grooves 46 are shallower at the forward end 52 than at the rearward end 53.

The constant velocity joint inner race 15 is provided so that it can be fitted over or slid onto the shaft 12. The inner race 15 has a central bore 54 containing the splines 30 so that the shaft 12 and inner race 15 will have a torque or driving relationship. The inner race 15 is provided with ball grooves 56 suitable for engaging the torque transmitting balls, not shown, in operation of the constant velocity universal joint. The inner race 15 also has a rear face 58.

The retaining member 20 is provided to lock the inner race 15 in position on the shaft 12. The retaining member 20 has an annular body 60. The annular body 60 includes a generally cylindrical or horizontal front section 62, and a generally cylindrical or horizontal rear section 64 of slightly reduced diameter than the front section 62. The annular body front section 62 is integrally joined to the rear section 64 by a generally vertical annular section 66. It can be seen that when the retaining member 20 is slipped onto the shaft 12 in a forward direction 36, the front section 62 of the annular body 60 slides over the midsection 38 of the shoulder 26, but the forward movement of the retaining member 20 along the shaft is arrested by the abutment of the vertical section 66 onto the rear face 40 of the shoulder.

Extending in the forward direction 36 from the annular body 60 are a plurality of tabs 70. In the embodiment shown there are four geometrically spaced tabs 70, although a greater or lesser number of tabs can be used. Preferably the tabs 70 are shaped generally as trapezoids, with a trapezoidal base 72 integrally joined to the annular body 60. The purpose of the tabs 70 is to provide a bendable element so that the retaining member 20 can be held in place on the shaft 12. Other shapes for the tabs 70 can be used. The tabs 70 are bendable to fit along the shoulder front face 34 after the retaining member 20 is slipped onto the shaft 12. The retaining member 20 and the tabs are preferably made of a bendable steel material, such as spring steel, although other materials can also be used. The tabs can be bent down into a locking relationship with the shoulder 26 and the shaft 12 by using hand tools, or by any other suitable method, such as by machine rolling.

Extending in the second or rearward axial direction 42 from the annular body 60 are a plurality of elongated arms 76. The arms are aligned with the grooves 46 of the splined section 24 so that the arms 76 slide within the grooves as the retaining member moves relative to the shaft 12. Although four arms are shown, a greater or lesser number of arms can be used. The arms 76 are preferably geometrically or symmetrically spaced about the annular body, and are generally linearly aligned with the four tabs 70, although other arrangements are possible. The arms have a first or front section 78 which is integrally joined to the adjacent annular body rear section 64. The arm front sections 78 are radially inwardly inclined.

Each arm 76 has joined to the front section 78, a second or rear section 80. The arm rear section 80 has on an extreme or rearward end a finger 82. The finger 82 is bent axially toward the shaft shoulder 26, i.e., in the first direction 36, making an acute angle with respect with the arm rear section 80. The purpose of the finger 82 is to engage the rear face 58 of the inner race 15 so that once the inner race is installed on the splined section 24 of the shaft 12, the inner race cannot readily slip off in the second direction 42. The fingers are bent backwards in the first direction to facilitate the installation of the splined inner race 15 around and along the retaining member 20.

In operation, the shaft 12 is encircled by the retaining member 20. The retaining member 20 is manipulated to align the arms 76 with the shaft grooves 46. The annular body 60 encircles the shaft shoulder midsection 38 and rear face 40. The retaining member tabs 70 are bent or crimped over the shaft shoulder front face 34. The crimping or bending of the tabs 70 to the shaft shoulder front face 34 connects the retaining member to the shaft 12. The annular body vertical section 66 presses against the shaft shoulder rear face 40. The inner race 15 is axially moved onto the shaft splined section 24 towards the shaft shoulder 26. An area of the inner race bore 54 adjacent the inner race front face contacts the fingers 60. The arms 76 are then is radially deformed inwardly thereby allowing the inner race 15 to continue to move toward the shaft shoulder 12. The inner race 15 will continue to be move toward the shaft shoulder 26 until the inner race 15 is stopped by the shaft shoulder 26. The annular body rear section 64 is encircled by the inner race bore 54 and is axially juxtaposed between the shoulder rear face 40 and the elongated arms 76.

As the inner race rear face 58 is moved toward the shaft shoulder 26, the fingers 82 exit the inner race bore 54 and expand radially outwardly to contact the inner race rear face 58. The position of the inner race 15 on the shaft 12 is now locked vis-à-vis the shaft. An intersection 84 or bend point between the arm first section 78 and the rear section 80 has contact with the flat floor 50 of the groove 46, and is compressed thereby. The compression increases as the inner race 15 is moved forward during installation axially toward the shaft shoulder 26 due to the radial inclination or tapering of the groove 46. Therefore, as the inner race 15 is moved forward during installation, the arm rear section 80 is urged radially outward to an increasing extent. This urging of the elongated arms in a radially outward direction insures that the fingers 82 spring radially outward after exiting the inner race bore 54 upon completion of the assembly operation.

The general assembly method is for the retaining member 20 to be inserted onto the shaft 12, and for the tabs 70 to be bent to lock the retaining member in place. The complete constant velocity universal joint, including the inner race 15, the cage, not shown, and outer race, not shown, are assembled together. The universal joint is then applied over the shaft 12, with the bore 54 of the inner race 15 fitting circumferentially around the elongated arms of the retaining member 20. The fingers 82 hook or engage the race rear face 58 as the fingers emerge from the bore 54 to lock the inner race and the entire constant velocity joint in a fixed position relative to the shaft 12. To remove the inner race 15 from the shaft 12, the tabs 70 are pried away from the shaft shoulder front face 34 and the inner race 15 can be slid off the shaft 12.

Figure 5:
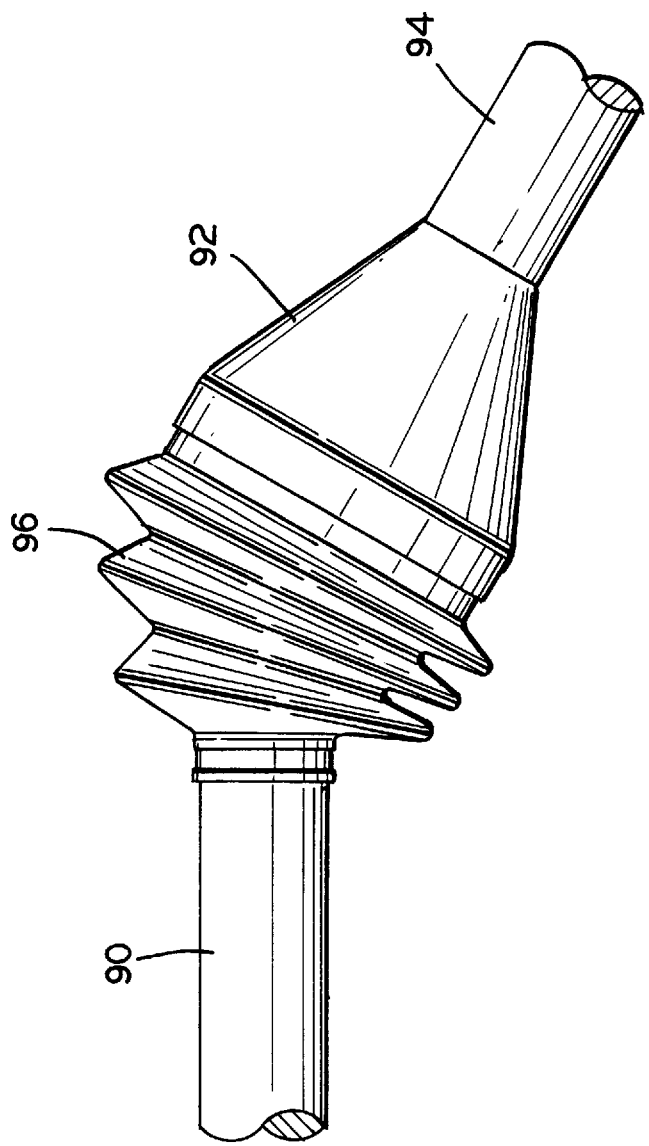
FIG. 5 is a view in elevation of a combination of a constant velocity joint shaft and constant velocity universal joint of the invention.

As shown in FIG. 5, the input shaft 90 is connected to the constant velocity universal joint 92 so that the rotation of the input shaft 90 will rotationally drive the output shaft 94. The connection between the input shaft and the constant velocity universal joint 92 is covered by a boot 96. Since the boot 96 is installed on the input shaft 90 before the universal joint 92 is slid onto the shaft, the boot 96 obscures the view of the retaining member, not shown in FIG. 5, and the inner race during assembly. Therefore, the constant velocity joint shaft and inner race combination of the invention are particularly beneficial in facilitating the blind assembly of the shaft and universal joint combination.

The principle and mode of operation of this invention of this invention have been explained and illustrated in its preferred embodiments. However it must be understood that this invention may be practiced otherwise than as specifically explained and illustrated without departing from its scope.

What is claimed is:

1. A constant velocity joint shaft and inner race combination comprising:
    a shaft having an annular shoulder and a splined section generally adjacent the shoulder;
    an inner race for a constant velocity joint, the inner race having a splined bore capable of mating with the splined section of the shaft; and
    a retaining member having an annular body with a plurality of tabs extending in a first axial direction, the tabs being bendable so that they can be bent over the annular shoulder to thereby secure the retaining member to the shaft, and the retaining member including a plurality of elongated arms extending from the annular body in a second axial direction completely through the inner race bore, the elongated arms having a finger at an extreme end to axially retain the inner race on the shaft.

2. A constant velocity joint shaft and inner race combination as described in claim 1 wherein the shaft has axial grooves in the splined section and the elongated arms extend in the grooves.

3. A constant velocity joint shaft and inner race combination as described in claim 2 wherein a radial depth of the grooves increases in the second axial direction.

4. A constant velocity joint shaft and inner race combination as described in claim 1 wherein the finger is bent axially toward the first direction.

5. A constant velocity joint shaft and inner race combination as described in claim 4 wherein the finger is bent in an acute angle with respect to the elongated arms.

6. A constant velocity joint shaft and inner race combination as described in claim 1 wherein the shaft annular shoulder has a front face, midsection, and rear face, and the retaining member annular body encircles the shaft annular shoulder midsection and rear face.

7. A constant velocity joint shaft and inner race combination as described in claim 6 wherein the retaining member annular body further includes a rear section encircled by the inner race bore, the retaining member rear section being axially juxtaposed between the shaft annular shoulder rear face and the elongated arms.

8. A constant velocity joint shaft and inner race combination as described in claim 1 wherein the tabs and the retaining member elongated arms are linearly aligned with one another.

9. A constant velocity joint shaft and inner race combination as described in claim 1 wherein the retaining member elongated arms have a radially inclined section adjacent the retaining member annular body.

10. A constant velocity joint shaft and inner race combination as described in claim 9 wherein the shaft has axial grooves in the splined section and the elongated arms extend in the grooves, and wherein a radial depth of the grooves increases in the second axial direction.

11. A constant velocity joint shaft and inner race combination as described in claim 10 wherein the shaft annular shoulder has a front face, midsection, and rear face, and the retaining member annular body encircles the shaft annular shoulder midsection and rear face, and wherein the retaining member annular body further includes a rear section encircled by the inner race bore, the retaining member rear section being axially juxtaposed between the shaft annular shoulder rear face and the elongated arms.

12. A constant velocity joint shaft and constant velocity universal joint combination comprising:
    an input shaft having an annular shoulder and a splined section generally adjacent the shoulder, the shaft splined section having a plurality of axial grooves;
    a constant velocity universal joint having an output shaft and an inner race with a splined bore fitted over the splined section of the input shaft;
    a retaining member, the retaining member having an annular body with a plurality of tabs extending in a first axial direction and bent over the annular shoulder, and the retaining member including a plurality of elongated arms extending from the annular body in a second axial direction completely through the inner race bore, each of the elongated arms being aligned with one of the axial grooves of the input shaft splined section, and each of the elongated arms having an acutely angled radially outward extending finger at an extreme end of the elongated arm to axially retain the inner race on the input shaft.

13. A constant velocity joint shaft and inner race combination as described in claim 12 wherein a radial depth of the axial grooves increases in the second axial direction.

14. A constant velocity joint shaft and inner race combination as described in claim 13 wherein the shaft annular shoulder has a front face, midsection, and rear face, and the retaining member annular body encircles the shaft annular shoulder midsection and rear face.

15. A constant velocity joint shaft and inner race combination as described in claim 14 wherein the retaining member annular body further includes a rear section encircled by the inner race bore, the retaining member rear section being axially juxtaposed between the shaft annular shoulder rear face and the elongated arms.

16. A retaining member for connecting a constant velocity joint shaft and a mating inner race of a constant velocity universal joint the retaining member having an annular body with a plurality of tabs extending in a first axial direction, the tabs being bendable so that they can be bent over the an annular shoulder of the shaft to thereby secure the retaining member to the shaft, and the retaining member including a plurality of elongated arms extending from the annular body in a second axial direction so that they can be extended completely through the a bore in the inner race, the elongated arms having a finger at an extreme end to axially retain the inner race on the shaft.

17. A retaining member as described in claim 1 wherein the tabs and the retaining member elongated arms are linearly aligned with one another.

18. A retaining member as described in claim 17 wherein the retaining member elongated arms have a radially inclined section adjacent the retaining member annular body.

19. A retaining member as described in claim 18 wherein the finger is bent axially toward the first direction.

20. A retaining member as described in claim 19 wherein the finger is bent in an acute angle with respect to the elongated arms.

\* \* \* \* \*